United States Patent [19]

Terashima et al.

[11] Patent Number: 5,142,521
[45] Date of Patent: Aug. 25, 1992

[54] RECORDING/REPRODUCING DEVICE

[75] Inventors: Shigeo Terashima, Tenri; Toshihisa Deguchi, Nara; Kunio Kojima, Nara; Shigemi Maeda, Nara, all of Japan

[73] Assignee: Sharp Kabushiki Kaisha, Osaka, Japan

[21] Appl. No.: 528,497

[22] Filed: May 25, 1990

[30] Foreign Application Priority Data

May 26, 1989 [JP] Japan .................................. 1-134063
Jun. 30, 1989 [JP] Japan .................................. 1-170654

[51] Int. Cl.⁵ .............................................. G11B 15/52
[52] U.S. Cl. ........................................ 369/50; 369/32; 358/342
[58] Field of Search ........................ 369/47, 48, 49, 50, 369/32, 13, 275.2, 288, 54, 53, 52, 51, 124; 331/25; 358/335, 342

[56] References Cited

U.S. PATENT DOCUMENTS

| | | | |
|---|---|---|---|
| 3,805,192 | 4/1974 | Ocnaschek et al. | 331/25 |
| 4,205,277 | 5/1980 | Poinas | 331/25 |
| 4,380,743 | 4/1983 | Underhill et al. | 331/25 |
| 4,445,143 | 4/1984 | Machida et al. | 358/330 |
| 4,517,667 | 5/1985 | Spragne | 369/122 |
| 4,539,662 | 9/1985 | Hatano et al. | 360/59 |
| 4,724,492 | 2/1988 | Kosaka et al. | 369/50 |
| 4,757,488 | 7/1988 | Nagai et al. | 369/50 |
| 4,817,075 | 3/1989 | Kikuchi et al. | 369/47 |
| 4,829,497 | 5/1989 | Sako et al. | 369/48 |
| 4,855,992 | 4/1989 | Ikegawa et al. | 369/275.2 |
| 4,862,107 | 8/1989 | Paneth | 331/25 |
| 4,897,829 | 1/1990 | Ikoma et al. | 369/288 |
| 4,902,300 | 2/1990 | Van Der Zande et al. | 369/47 |
| 4,907,216 | 3/1990 | Rijnsburger | 369/245 |
| 4,916,685 | 4/1990 | Endoh et al. | 369/47 |
| 4,932,016 | 6/1990 | Yoshida et al. | 369/48 |
| 4,975,898 | 12/1990 | Yoshida | 369/48 |

FOREIGN PATENT DOCUMENTS 0275972 7/1988 European Pat. Off. .
0277655 8/1988 European Pat. Off. .
1-39632 2/1989 Japan .

OTHER PUBLICATIONS

"Zukai Compact Disk Dokuhon" (Illustrative Compact Disk Handbook) second edition Apr. 25, 1988.

Primary Examiner—Roy N. Envall, Jr.
Assistant Examiner—Thai Tran

[57] ABSTRACT

A recording/reproducing device performs the recording/reproduction on a recording medium having an information recording area and a table of contents area. The recording medium is provided with guiding grooves that snake in cycles corresponding to values of absolute addresses. The device divides the information recording area into a plurality of domains. Each domain corresponds to a single sampling frequency with respect to the information being recorded. An electromagnet and an optical head record information in the domain that corresponds to its sampling frequency and records additional information concerning the division in the table of contents. A spindle motor drives the disk which is adjusted such that the velocity of the disk is changed for each domain during recording and reproduction. A demodulator obtains the absolute addresses through demodulation by comparing frequencies determined from the snaking cycles of the guiding grooves with a reference frequency. An operational circuit converts the demodulated absolute addresses in accordance with the velocity of the disk into corrected absolute addresses that represented the period of time which has elapsed since the starting time. As a result, the burden imposed on the spindle motor is relieved, the demodulation of the absolute addresses may be executed accurately even when the rotational speed of the disk varies, and the time elapsed since the start of the recording/reproduction may be determined.

45 Claims, 6 Drawing Sheets

RECORDING/REPRODUCING DEVICE

FIELD OF THE PRESENT INVENTION

The present invention relates to a recording/reproducing device that records and reproduces different types of information items that were produced at various sampling frequencies, on a writable recording medium such as a magneto-optical disk or other medium.

BACKGROUND OF THE INVENTION

In the conventional art, so-called compact disks (hereinafter referred to as CDs) where pieces of music information are recorded as digital signals through mechanical pits, are widely used. Information recorded on CDs is reproduced by means of a disk reproducing device used only for reproducing.

In a CD, a plurality of pieces of information are usually recorded in succession. During the reproduction, absolute addresses previously recorded on the disk and absolute addresses indicating the recording start position of each piece of information and being recorded in a TOC (Table Of Contents) area provided in the inner periphery or other location of the disk, are compared, and the desired pieces of information may be reproduced successively or selectively.

When recording pieces of music information on or using rewritable disks that have been developed recently such as magneto-optical disks, Direct Read after Write type disks in which information can be recorded only once, or other types of disks, a compatible disk recording/reproducing device using a common method of reproduction for such magneto-optical disks and conventional CDs needs to be provided. In this case, a so-called constant linear velocity (CLV) that is employed in reproducing devices for CDs may be adopted as control method for the disk rotation during the recording and reproduction.

Among the sampling frequencies used in recording mediums whereon digital information is recorded, for instance the sampling frequency used in Digital Audio Tapes (hereinafter referred to as DATs) equals 48 kHz, and the sampling frequency used in satellite broadcasting equals 32 kHz. That is, both DATs and satellite broadcastings have sampling frequencies different from the sampling frequency used in CDs which is equal to 44.1 kHz. However the information recorded on these digital recording mediums needs to be recorded as it is on the writable disks described earlier.

When recording pieces of digital information such as pieces of music information etc., produced by different sampling frequencies together on a single disk in their respective recording frequencies, to make the recording density of the information on the disk approximately uniform and independently of the sampling frequencies, the linear velocity on the disk has to be changed according to the sampling frequency of the information to be recorded so that information having a high sampling frequency is recorded and reproduced with a high linear velocity.

In this case, when reproducing pieces of information successively, the linear velocity needs to be changed at the boundary separating pieces of information each time the sampling frequency changes. This not only causes the burden on the motor to be increased and might shorten its life span, but also gives rise to problems such as an increase in the latency due to the change in the linear velocity.

In the conventional art, a method for forming the absolute addresses on a disk such as a writable disk, has been discussed where the absolute addresses are written by having guiding grooves snake on the disk such that the pitch of the undulation in a radial direction (wobbling) corresponds to the absolute addresses. When recording the absolute addresses using guiding grooves that snake in the manner described above, an absolute address is usually recorded after having passed through an FM (Frequency Modulation) process where the frequency of a carrier wave having a constant amplitude is modulated by an absolute address signal. Consequently, in order to reproduce an absolute address during the recording of information, the frequency-modulated signal needs to pass through an FM demodulation process that converts the frequency of the frequency-modulated signal into an amplitude.

However, during the recording or reproduction, when changing the rotational speed of the disk in accordance with the sampling frequency of the different pieces of information as described above, the cycles of the snaking guiding groove are modified due to the variation in the rotational speed of the disk. This causes an accurate demodulation of the absolute addresses to be infeasible.

SUMMARY OF THE PRESENT INVENTION

An object of the present invention is to provide a recording/reproducing device that enables absolute addresses to be obtained accurately when demodulating the cycles of guiding grooves that are snaking on a recording medium, even when the velocity of the recording medium varies.

Another object of the present invention is to provide a recording/reproducing device where the time elapsed since the start of the recording or reproduction can be determined according to corrected absolute addresses obtained by correcting absolute addresses in accordance with the velocity of a recording medium.

Still another object of the present invention is to provide a recording/reproducing device where the burden imposed on the driving means of a recording medium is reduced, and the overall latency due to variations in the velocity of the recording medium is shortened.

In order to achieve the above objects, a recording/reproducing device, in accordance with the present invention, performs the recording/reproduction of information on a writable recording medium comprising an information recording area and a TOC area and is provided with guiding grooves that snake in cycles corresponding to absolute addresses. This device further comprises:

recording means for recording information in the information recording area and for recording the absolute addresses indicating at least the position where the above information is recorded, as additional information in the TOC area, speed changing means for changing the velocity of the recording medium according to the sampling frequency of each information being recorded or reproduced, a demodulator that compares frequencies determined through the snaking cycles of the guiding grooves with a reference frequency, and where the absolute addresses are obtained through demodulation, demodulator adjusting means for changing the reference frequency of the demodulator in accordance with the sampling frequency of each information, and operational means for converting the absolute addresses after they are demodulated in the demodulator, according to the velocity of the recording medium, and for determining corrected absolute addresses that correspond to the time elapsed using the recording/reproduction starting time as reference.

With the above arrangement, the reference frequency of the demodulator is changed in accordance with the velocity of the recording medium during the recording or reproduction of information. The absolute addresses may be thus obtained accurately when demodulating the cycles of the snaking guiding grooves even when the velocity of the recording medium varies.

Moreover, provision is made such that during the recording and the reproduction, the demodulated absolute addresses are converted in accordance with the velocity of the recording medium and corrected absolute addresses that correspond to the time elapsed using the recording/reproducing starting time as reference are determined. The time elapsed since the start of the recording or reproduction may be thus determined according to these corrected absolute addresses.

Another recording/reproducing device in accordance with the present invention performs the recording/reproduction of information on a writable recording medium comprising an information recording area capable of recording a plurality of pieces of information produced by mutually different sampling frequencies and a TOC area for recording additional information concerning the information recorded in the recording area. This device further comprises:

division setting means for dividing, according to a setting from outside and a set capacity ratio, the information recording area into a plurality of domains respectively corresponding to each sampling frequency of the pieces of information to be recorded, and for producing additional information that indicates the details of the division, recording means for determining the sampling frequency of the information to be recorded, for recording each information in a domain of the information recording area that corresponds to its sampling frequency, and for recording the additional information including the details of the division in the TOC area, reproducing means for reproducing the information recorded in the information recording area and the additional information recorded in the TOC area, driving means for driving the recording medium during the recording and the reproduction, and speed changing means for adjusting the speed of the driving means such that the velocity of the recording medium is changed for each domain when recording and reproduction is performed in the information recording area.

With the arrangement described above, the information recording area of the recording medium is preliminary divided in accordance to a setting from outside, i.e. an instruction from a user, into a plurality of domains that respectively correspond to each of the sampling frequencies used in CDs, DATs or other mediums, and the pieces of information having the same sampling frequency are recorded in the same domain. When for example successive reproductions are performed on the recording medium, the velocity of the recording medium may be thus maintained constant within each domain. This permits the number of times the velocity of the recording medium is changed to be reduced, thereby relieving the burden imposed on the driving means and reducing the overall latency due to the velocity changes.

When the recording medium is a disk, the division setting means should preferably perform the division such that the higher the sampling frequency corresponds to the domain located at the outer part of the disk. In this case, the closer it gets to the outer periphery, the greater the linear velocity becomes. Therefore, the difference between the rotational speeds at different positions located on the same radius of the disk, is reduced as compared to the case where pieces of information having the same sampling frequency are recorded on the entire disk. Consequently, when access is carried out, and when the recording means and/or the reproducing means is moved in a radial direction, the amount by which the rotational speed of the driving means varies may be reduced.

Besides, the details of the division of the information recording area are recorded as additional information in the TOC area. As a result, after the recording medium is taken out of the recording/reproducing device, the recording/reproducing device is able to find out the details of the division by reading the information recorded in the TOC area during the next recording/reproduction.

For a fuller understanding of the nature and advantages of the present invention, reference should be made to the ensuing detailed description taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 to FIG. 5 are views illustrating an embodiment of the present invention;

FIG. 7(a) is a schematic plan view illustrating an example of division in the information recording area of a magneto-optical disk; and FIG. 7(b) is a schematic plan view illustrating another example of division in the information recording area of a magneto-optical disk.

DETAILED DESCRIPTION OF THE EMBODIMENTS

An embodiment of the present invention will be described below with reference to FIG. 1 to FIG. 5.

Figure 1:
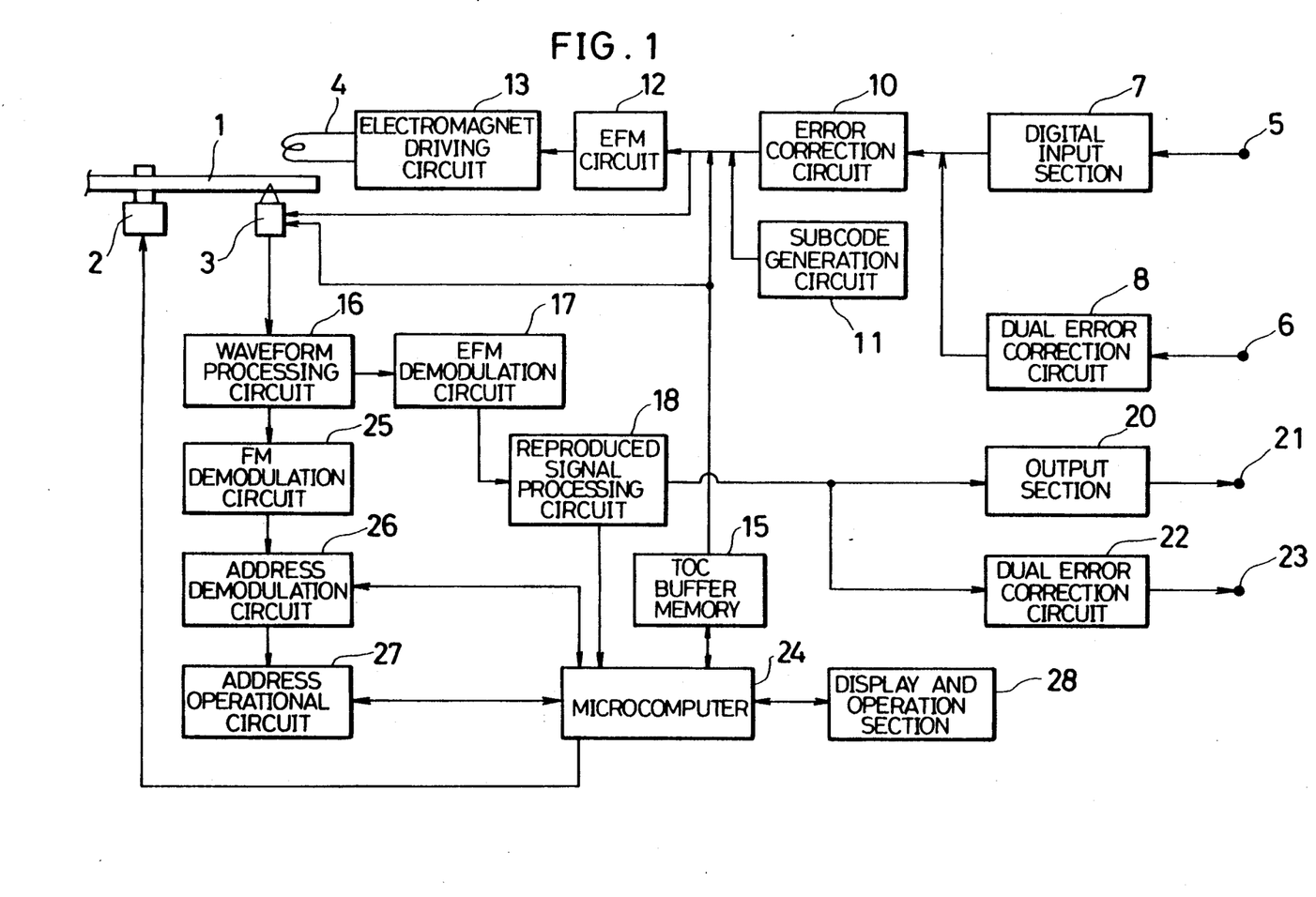
FIG. 1 is a block diagram illustrating a disk recording/reproducing device.
Figure 2:
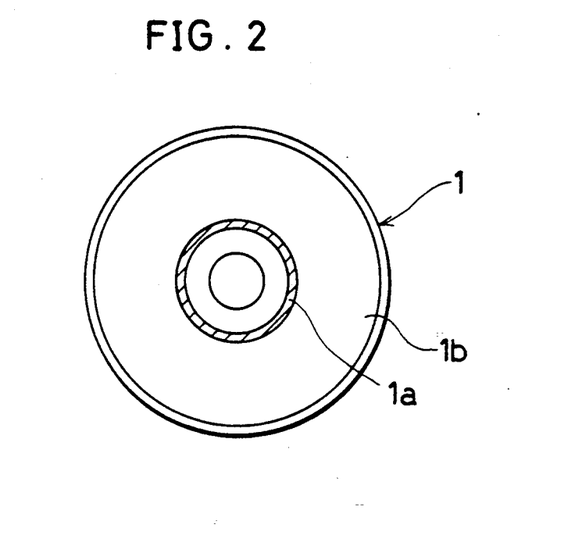
FIG. 2 is a schematic plan view illustrating a magneto-optical disk.

As illustrated in FIG. 1, a disk recording/reproducing device that is a recording/reproducing device in accordance with the present invention, comprises:

a spindle motor 2 that supports and permits a magneto-optical disk 1 as a writable recording medium to rotate, an optical head 3 as recording means and reproducing means, that projects a laser beam on the magneto-optical disk 1 during the recording and the reproduction, and that reproduces information, additional information and absolute addresses in response to a reflected beam from the magneto-optical disk 1, and an electromagnet 4 as recording means, that records the information and the additional information by applying a magnetic field to the magneto-optical disk 1.

The electromagnet 4 is capable of recording new information over previously recorded information, i.e., is capable of overwriting.

The disk recording/reproducing device comprises a first input terminal 5 and a second input terminal 6. Provision is made such that analog information from magnetic tapes or digital pieces of information from CDs, DATs, satellite broadcastings or other medium, are entered through the first input terminal 5. Meanwhile, digital information from a computer or the like is entered through the second input terminal 6.

The analog information corresponding to information from a CD is entered through the first input terminal 5, is sampled so as to have a sampling frequency equal to 44.1 kHz that is the sampling frequency used in CDs and converted into digital information in a digital input section 7, and is then sent to an error correction circuit 10.

The digital information that is entered through the first input terminal 5 passes through the digital input section 7 and is sent as it is into the error correction circuit 10. The digital information that is entered through the second input terminal 6, it is sent through a dual error correction circuit 8 into the error correction circuit 10.

After the information goes through the error correction process in the error correction circuit 10, a subcode generated in a subcode generation circuit 11 is supplemented thereto if necessary. The information then goes through an EFM (Eight Fourteen Modulation) process in an EFM circuit 12 and is then sent to an electromagnet driving circuit 13.

The electromagnet driving circuit 13 drives the electromagnet 4 according to the information modulated in the EFM circuit 12, and a laser beam emitted from the optical head 3 is irradiated simultaneously on the magneto-optical disk 1. This permits the information to be recorded in an information recording area 1b (see FIG. 2) located on the magneto-optical disk 1. A TOC area 1a where additional information concerning the information recorded in the information recording area 1b is recorded, is accommodated in a lead-in area situated in the inner periphery of the magneto-optical disk 1.

In the present embodiment, recording/reproduction of information is executed basically through a constant linear velocity (CLV) control. In addition, when recording/reproducing information, a microcomputer 24 that will be described later, changes the rotational speed, i.e. the linear velocity, at which the magneto-optical disk 1 is rotated by the spindle motor 2 in accordance with the sampling frequency of the information to be recorded. An information recording density may be thus maintained approximately constant independent of the sampling frequencies of the pieces of information recorded.

Figure 3:
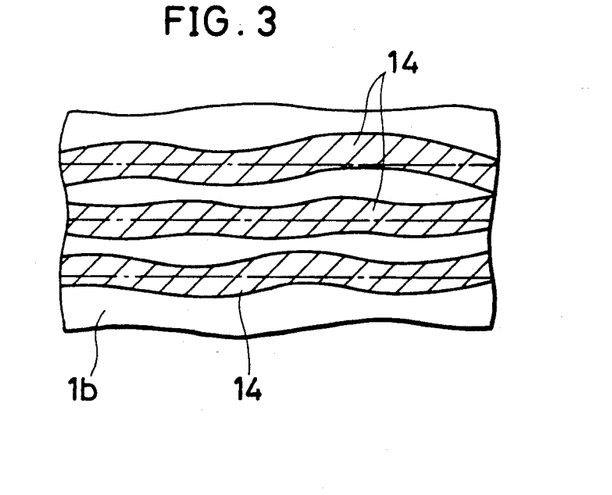
FIG. 3 is an enlarged plan view illustrating a magneto-optical disk.

As illustrated in FIG. 3, guiding grooves 14 extending in a circumferential direction and formed in a spiral shape or in the shape of concentric circles, are accommodated beforehand on the magneto-optical disk 1. The guiding grooves 14 undulate in a radial direction of the disk (wobbling). Namely, the guiding grooves 14 snake such that the pitch of the undulation corresponds to frequencies that were modulated as the absolute addresses of the different sections formed on the magneto-optical disk 1 go through an FM process.

In FIG. 1, the present disk recording/reproducing device comprises a TOC buffer memory 15 where there are stored absolute addresses are stored indicating the recording start and recording end positions for each piece of information recorded in the recording area 1b of the magneto-optical disk 1, as well as, the sampling frequencies used when the pieces of information were produced, as additional information.

The contents of the TOC buffer memory 15 are recorded in the TOC area 1a accommodated on the magneto-optical disk 1 for instance at the time the magneto-optical disk 1 is discharged from the recording/reproducing device. In such a case, the additional information stored in the TOC buffer memory 15 is sent to the EFM circuit 12 where it goes through an EFM process and is recorded thereafter by means of the electromagnet 4 in the same manner as described above. Besides, each time information is recorded in the information recording area 1b, additional information concerning the information recorded may be recorded in the TOC area 1a if desired. In that case, during the recording and reproduction, if the contents stored in the TOC buffer memory 15 happen to be lost due to a power blackout or other cause, the most recently recorded contents of the information recording area 1b are still stored in the TOC area 1a.

The information recorded in the information recording area 1b, the additional information stored in the TOC area 1a and the absolute addresses indicated by the snaking of the guiding grooves 14, are reproduced by having the optical head 3 project a laser beam on the magneto-optical disk 1.

A waveform processing circuit 16 where the waveform of the information reproduced by the optical head 3 is processed as necessary, is connected to the optical head 3. The information or additional information that underwent the waveform processing, then goes through an EFM demodulation process for demodulating the information that went through an EFM process in an EFM demodulation circuit 17, and is further processed as required in a reproduced signal processing circuit 18. The information recorded in the information recording area 1b is then released as it is as digital information through an output section 20 and a first output terminal 21, or is released through the first output terminal 21 after being converted into an analog information in the output section 20, if needed.

When the information is to be used in a computer or the like, the information that was processed as necessary in the reproduced signal processing circuit 18, then goes through a required error correction process in a dual error correction circuit 22. The information is then released as digital information through a second output terminal 23.

Meanwhile, after it is processed as required in the reproduced signal processing circuit 18, the additional information is stored in the TOC buffer memory 15 through the microcomputer 24.

The absolute address that went through a waveform process in the waveform processing circuit 16, then undergoes an FM demodulation process that will be described in details later on, for converting the frequency into an amplitude by an FM demodulation circuit 25 that serves as demodulator. Then an address demodulation for obtaining the value of the absolute address from the amplitude is performed in an address demodulation circuit 26. The address thus obtained is sent to the microcomputer 24 and in addition to an address operational circuit 27 that serves as operational means.

During the recording and the reproduction of information, in the address operational circuit 27, the above absolute address is converted in accordance with the rotational speed of the magneto-optical disk 1, and a corrected absolute address that corresponds to the time elapsed using the recording/reproduction starting time as reference, is determined. This corrected absolute address is then transmitted to the microcomputer 24.

The microcomputer 24 is connected to a display and operation section 28. The display and operation section 28 displays the time elapsed since the reproduction started based on the corrected absolute addresses when information is being reproduced, and in addition is used by the user for instructing the recording, reproduction of information, or other operation.

The reproduction process of the absolute addresses during the recording of information to or the reproduction of information from the information recording area 1b will be described below.

Figure 4:
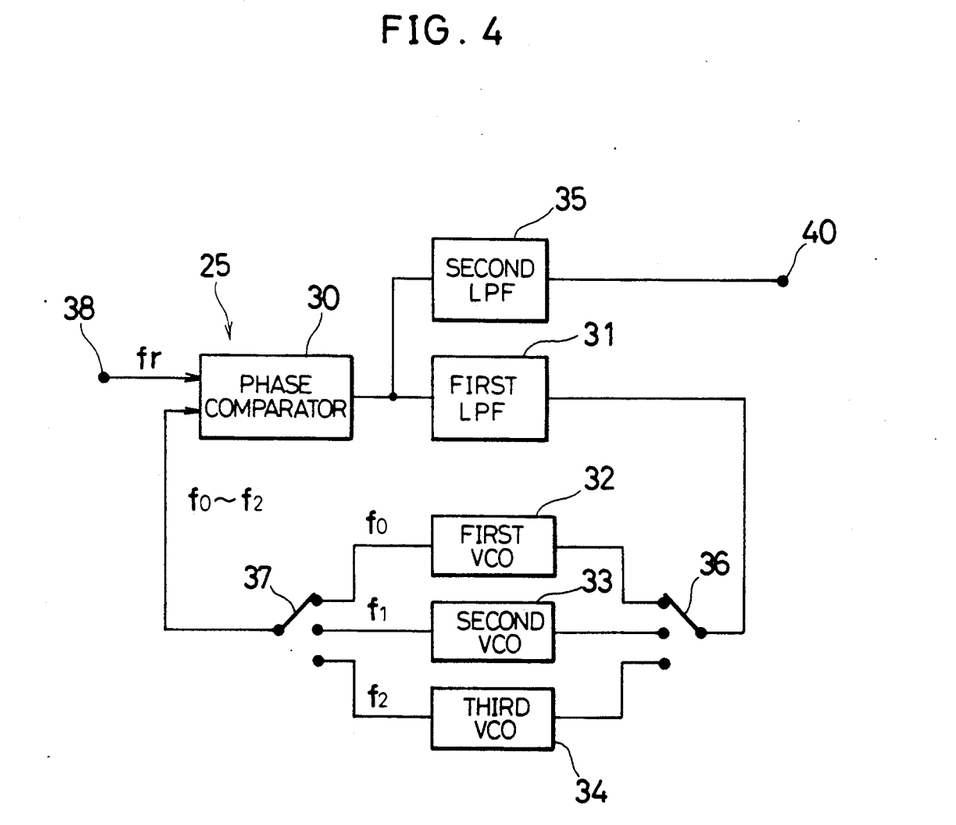
FIG. 4 is a block diagram illustrating an FM demodulation circuit.

FIG. 4 illustrates in details the configuration of the FM demodulation circuit 25. The FM demodulation circuit 25 is constituted by a so-called phase-locked loop (PLL) and comprises a phase comparator 30, a first low-pass filter (first LPF) 31, first, second and third voltage controlled oscillators (VCO) 32, 33 and 34, and a second low-pass filter (second LPF) 35 that is connected to the phase comparator 30. Changeover switches 36 and 37 are mounted respectively on both sides of the first, second and third voltage controlled oscillators 32, 33 and 34. The changeover switches 36 and 37 serving as demodulator adjusting means, are switched in an interlocked manner thereby permitting one of the voltage controlled oscillators 32, 33 and 34 to be selected and connected with the first low-pass filter 31 and the phase comparator 30.

Suppose now that, as illustrated in FIG. 4, the first voltage controlled oscillator 32 is selected. When an absolute address is reproduced, a signal whose frequency $f_r$ is frequency modulated, i.e., a signal that corresponds to a pitch of the snaking guide grooves 14, is entered into the phase comparator 30 through an input terminal 38. In the phase comparator 30, the signal of the frequency $f_r$ is compared with a signal having a frequency $f_0$ that was generated in the first voltage controlled oscillator 32, and a signal that is released in response to the difference between the frequencies is sent through the first low-pass filter 31 to the first voltage controlled oscillator 32. In the first voltage controlled oscillator 32, a signal of a frequency $f_0$ corresponding to the size of the signal received from the first low-pass filter 31 is released and returned to the phase comparator 30. The output of the phase comparator 30 is then sent through the second low-pass filter 35 to an output terminal 40 where a post-FM demodulation signal is released.

During the fabrication of the magneto-optical disk 1, a carrier having a frequency $f_A$ goes through an FM process, and the guiding grooves 14 corresponding to the absolute addresses are formed in accordance with the modulated frequency. In this case, if the sampling frequency of all the pieces of information to be recorded on the magneto-optical disk 1 is equal to 44.1 kHz, the absolute addresses may be obtained through demodulation by means of the sole first voltage controlled oscillator 32. However in the present embodiment, pieces of information that are produced by various sampling frequencies are to be recorded and provision is made such that, during the recording, the rotational speed of the magneto-optical disk 1 varies in accordance with the sampling frequency of the piece of information to be recorded. The frequency of the carrier, i.e. the reference frequency, thus changes according to the rotational speed of the magneto-optical disk 1. Therefore, the absolute addresses can not be obtained through demodulation effectuated by means of the first voltage controlled oscillator 32 alone.

Hence in the present embodiment, depending on the number of sampling frequencies used when the pieces of information were produced, for example three voltage controlled oscillators, i.e. the first, second and third voltage controlled oscillators 32, 33 and 34 are provided. The first, second and third voltage controlled oscillators 32, 33 and 34 are respectively switched over to each time the sampling frequency of the piece of information to be recorded changes. This enables the demodulation of the absolute addresses during the recording despite the variation in the rotational speed of the magneto-optical disk 1. In this case, provision is made such that the first, second and third voltage controlled oscillators 32, 33 and 34 oscillate at mutually different frequencies $f_0$ to $f_2$ with respect to signals coming from the first low-pass filter 31 that are of the same size. In addition, the conversion rate used to perform the conversion of an amplitude into an absolute address in the address demodulation circuit 26, varies together with the switch to the first, second or third voltage controlled oscillator 32, 33 or 34.

Next, the relation between an absolute address and a corrected absolute address will be explained with reference to FIG. 5.

Figure 5:
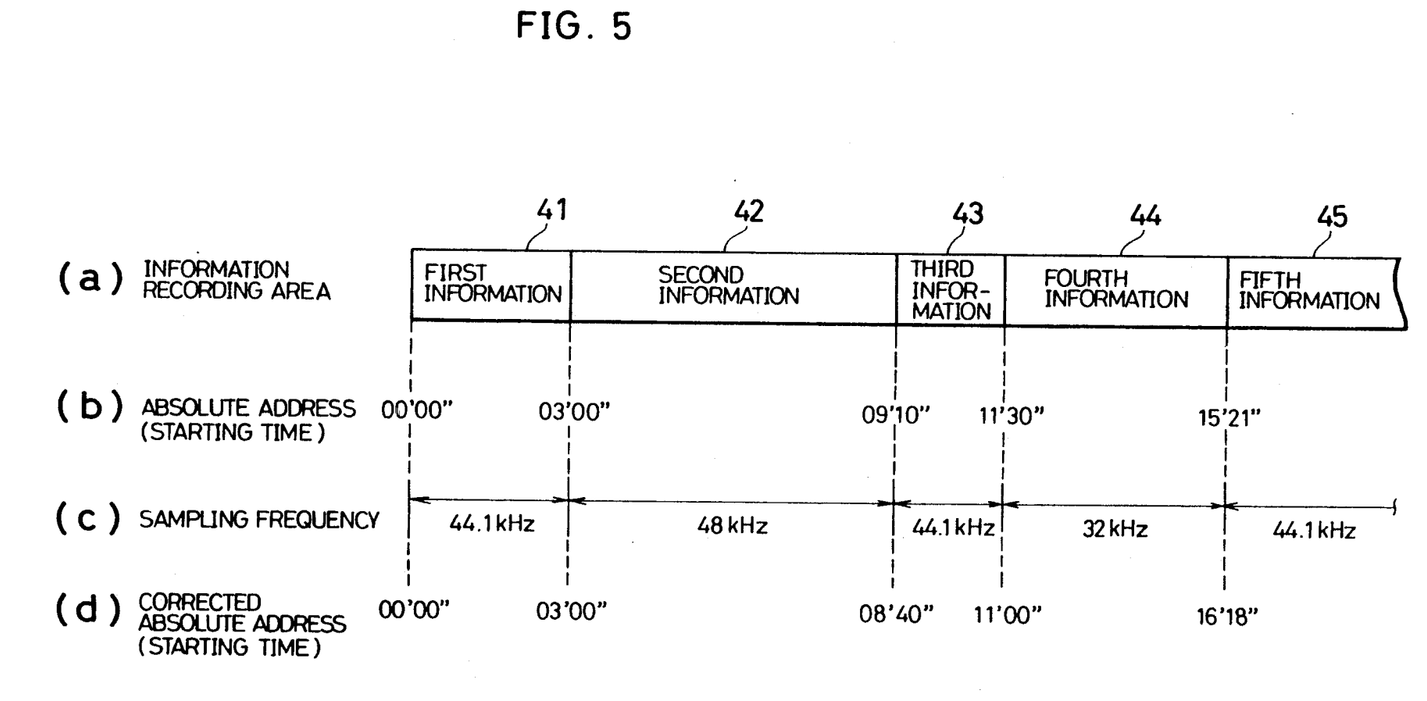
FIGS. 5(a)–5(d) are explanatory views illustrating how pieces of information are recorded on a magneto-optical disk.

Suppose that as indicated by (a) in FIG. 5, first information 41 to fifth information 45 are to be successively recorded in the information recording area 1b of the magneto-optical disk 1. Here, when it is assumed that the first to fifth pieces of information 41 to 45 are all produced using a CD sampling frequency equal to 44.1 kHz and thereby that the linear velocity of the rotating magneto-optical disk 1 is constant, the recording or reproduction starting times of the first to fifth pieces of information 41 to 45 are as indicated by (b) in FIG. 5. The recording/reproduction starting times indicated by (b) in FIG. 5 coincide with the values of the absolute addresses recorded beforehand on the magneto-optical disk 1.

However, suppose that in practice only the first, third and fifth pieces of information 41, 43 and 45 are produced using the 44.1 KHz sampling frequency, and that the second information 42 is produced with a sampling frequency equal to 48 kHz and the fourth information 44 is produced with a sampling frequency equal to 32 kHz, as shown by (c) in FIG. 5. In this case, the rotational speed of the magneto-optical disk 1 increases as compared to the usual rotational speed, during the recording/reproduction of the second information 42 and lowers during the recording/reproduction of the fourth information 44. Consequently, when recording-/reproducing the pieces of information 41 to 45, the recording/reproduction starting times of the pieces of information 41 to 45 as indicated by (d) in FIG. 5, differ from the times at which the recording/reproduction of the pieces of information 41 to 45 would have started if all the pieces of information 41 to 45 were produced with the sampling frequency used in CDs. The recording/reproduction starting times indicated by (d) in FIG. 5 coincide with the corrected absolute addresses.

Another embodiment of the demodulation circuit 25 will be described below. The members composing the demodulation circuit 25 that were used in the embodiment described above will be designated with the same code and their detailed description will be omitted.

Figure 6:
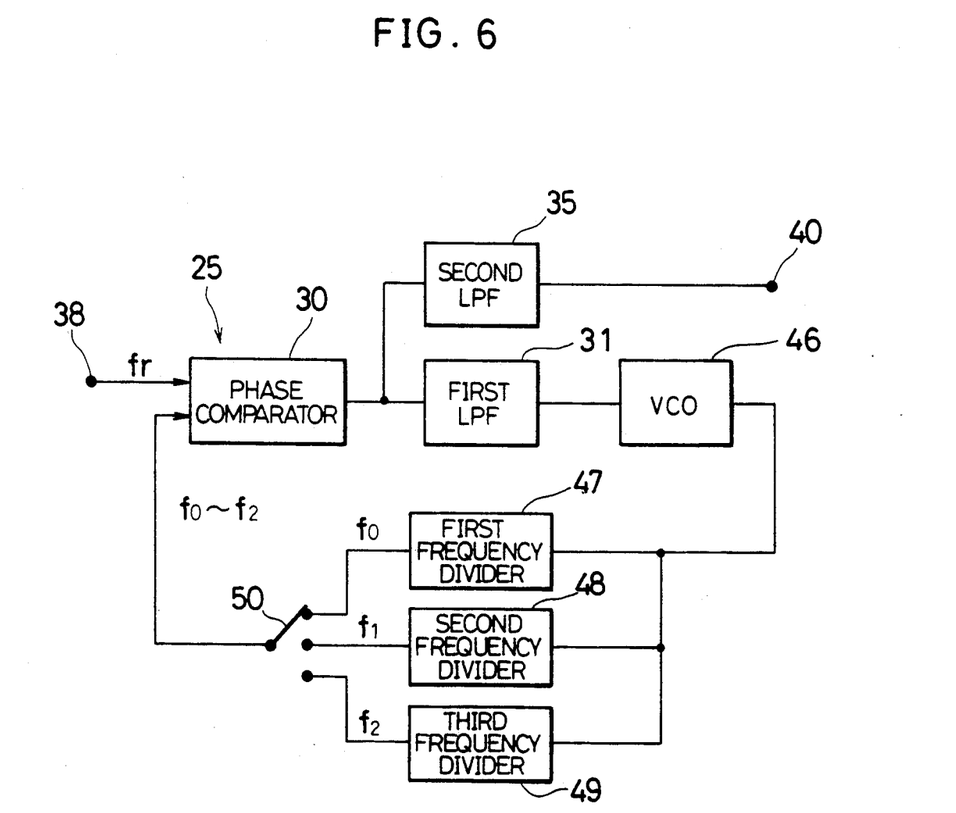
FIG. 6 is a block diagram illustrating another embodiment of an FM demodulation circuit.

As illustrated in FIG. 6, only one voltage controlled oscillator 46 is installed in the FM demodulation circuit 25, and first, second and third frequency dividers 47, 48 and 49 having mutually different division ratios, are juxtaposed and disposed between the voltage controlled oscillator 46 and the phase comparator 30. When determining an absolute address through demodulation during the recording/reproduction, the reference frequency can be changed in accordance with the sampling frequency of the information to be recorded by selecting one of the frequency dividers 47 to 49 using a changeover switch 50 as demodulator adjusting means.

Figure 7:
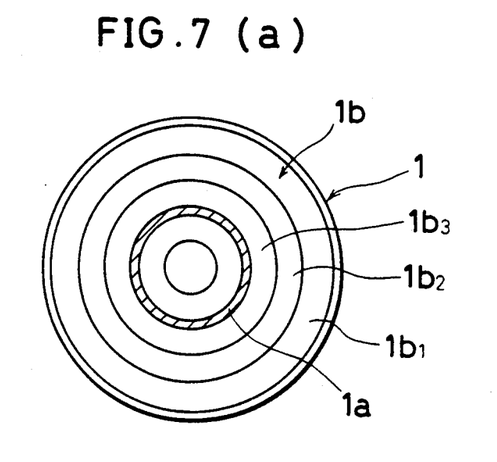
FIG. 7 is a view illustrating another embodiment of the present invention consisting of FIGS. 7(a) and 7(b)

Another embodiment of the present invention will be described below with reference to FIG. 1 to FIG. 4, as well as to FIG. 7.

The disk recording/reproducing device of the present embodiment has almost the same configuration as the disk recording/reproducing device of the embodiment described above. Parts that are similar will be thus designated with the same reference number and their detailed description will be omitted.

As illustrated in FIG. 1, when an absolute address is read during the recording/reproduction of information, the absolute address goes though a waveform process in a waveform processing circuit 16, and then through an FM demodulation process in an FM demodulation circuit 25 where its frequency is converted into an amplitude. At this time, changeover switches 36 and 37 shown in FIG. 4, are switched in an interlocked manner, and one of the voltage controlled oscillators 32 to 34 is selected and connected to a first low-pass filter 31 and a phase comparator 30. The voltage controlled oscillators 32, 33 and 34 correspond respectively to domains $1b_1$, $1b_2$ and $1b_3$, to be described later, formed in an information recording area $1b$.

More precisely, the frequency $f_r$ of a signal fed into an input terminal 38 of the FM demodulation circuit 25 varies in accordance with the linear velocity of the magneto-optical disk 1. The first to third voltage controlled oscillators 32 to 34 are thus changed over according to the linear velocity of the magneto-optical disk 1, or in other words according to which of the domains $1b_1$ to $1b_3$ of the information recording area $1b$ the position of the absolute address is located in. The signal released by the phase comparator 30 is led through a second low-pass filter 35 to an output terminal 40, where an FM demodulated signal is sent from to an address demodulation circuit 26 shown in FIG. 1.

Then in the address demodulation circuit 26, an address demodulation process that enables the value of the absolute address to be obtained from the FM demodulated signal, is executed. The demodulated absolute address is sent to a microcomputer 24 and in addition to an address operational circuit 27.

Like in the embodiment described earlier during the recording/reproduction of information, in the address operational circuit 27, the absolute address is converted in accordance with the linear velocity of the magneto-optical disk 1 that is different in each of the domains $1b_1$ to $1b_3$ to be described later, and a corrected absolute address that corresponds to the time elapsed using the recording/reproduction starting time as reference is determined. The corrected absolute address is then sent to the microcomputer 24. More specifically, the value of the absolute address is set such as to correspond to the time elapsed using the recording/reproduction starting time as reference assuming that the linear velocity of the magneto-optical disk 1 is constant in the entire information recording area $1b$. As a result, when as in the present embodiment the linear velocity of the magneto-optical disk 1 varies in each of the domains $1b_1$ to $1b_3$, the value of the absolute address does not correspond to the aforementioned time elapsed since the recording/reproduction starting time. The value of the absolute address is therefore converted in accordance with the linear velocity of the magneto-optical disk 1 in the address operational circuit 27, and a corrected absolute address corresponding to the time elapsed since the recording/reproduction starting time, is obtained.

The microcomputer 24 also works as division setting means, and divides the recording information area $1b$ in response to an instruction from a user, i.e., in response to an instruction made by the user and received from the display and operation section 28. The recording information area $1b$ is divided according to a preset capacity ratio into a plurality of domains $1b_1$ to $1b_3$ respectively corresponding to the sampling frequencies of the various recording sources such as CDs, DATs or other mediums. The microcomputer 24 also generates additional information indicating the details of the division and records the additional information in a TOC area $1a$ through a TOC buffer memory 15.

Further, as described in the previous embodiment, the microcomputer 24 also serves as speed changing means and controls the rotational speed of a spindle motor 2 as driving means, such that basically the recording/reproduction of information on the magneto-optical disk 1 is executed in constant linear velocity control. In addition during the recording/reproduction of information, the microcomputer 24 adjusts the rotational speed of the spindle motor 2 so that the linear velocity on the magneto-optical disk 1 changes in each of the domains $1b_1$ to $1b_3$ formed in the information recording area $1b$ in order to maintain an approximately constant recording density independent of the sampling frequencies of the pieces of information.

The division process of the information recording area $1b$ will be explained below. Recordings totaling about 70 minutes can be effectuated in the information recording area $1b$ provided that only information from CDs is recorded in the entire area. However, when mixing and recording pieces of information from mediums other than CDs that have sampling frequencies different from the one used in CDs, such as DATs, satellite broadcastings etc., the total recording time varies with the ratio of pieces of information from mediums other than CDs included.

When dividing the information recording area $1b$, the recording times allotted to information from CDs (sampling frequency of 44.1 kHz), DATs (sampling frequency 48 kHz) and satellite broadcastings (sampling frequency 32 kHz) respectively, are for example set in percentages.

In concrete terms for instance, before the recording on the magneto-optical disk 1 starts, the recording time for information from CDs is preset to 40%, the recording time for information from DATs to 30% and the recording time for information from satellite broadcastings to 30%. The microcomputer 24 consequently divides the information recording area $1b$ into three domains $1b_1$ to $1b_3$ (see FIG. 7(a)), calculates the absolute addresses of the start position and end position for each of the domains $1b_1$ to $1b_3$ in accordance with the proportion of recording time preset for each recording medium and record these absolute addresses in the TOC area $1a$. At this time, the practical recording time allotted to each recording medium is calculated and displayed on the display and operation section 28. In the foregoing description, the distribution of recording time for CDs, DATs etc. has been set in percentages. However, the distribution may set in real time for instance: 20 minutes for CDs, 20 minutes for DATs and the remaining time for satellite broadcastings or other mediums.

The microcomputer 24 divides the information recording area $1b$ into the domains $1b_1$ to $1b_3$ such that the domain $1b_1$ to be employed for information from a recording medium that has a high sampling frequency, is located in the outer periphery of the magneto-optical disk 1. Namely, when the user instructs to divide the information recording area $1b$ into three divisions for CDs, DATs and satellite broadcastings respectively, the microcomputer 24 consequently allots the domain $1b_1$ situated in the outer periphery to information from DATs that uses the highest sampling frequency, the domain $1b_2$ situated in the central portion in a radial direction to information from CDs that have the second highest sampling frequency, and the domain $1b_3$ situated in the innermost periphery to information from satellite broadcastings that have the lowest sampling frequency.

Accordingly, the domain $1b_1$ where information having a high sampling frequency is to be recorded and thereby where the linear velocity needs to be accelerated, is located in the outer periphery of the magneto-optical disk 1. This enables the amount by which the rotational speed of the spindle motor 2 varies in accordance with the radial position of the information to be recorded on the magneto-optical disk 1, to be reduced as compared to the case where pieces of information having the same sampling frequency are recorded in the entire information recording area $1b$. As a result, during the access of information, the amount by which the rotational speed of the spindle motor 2 varies when an optical head 3 is moved in a radial direction of the magneto-optical disk 1, is reduced thereby enabling the access time to be shortened and the burden of the spindle motor 2 to be lightened. Moreover, it is the microcomputer 24 that makes the choice of setting the domain $1b_1$ to be used for information having a high sampling frequency, in the outer periphery of the magneto-optical disk 1. The division instruction the user has to input is thus relatively simple.

In the above example, the information recording area $1b$ was divided into three domains $1b_1$ to $1b_3$. However, when pieces of information from CDs and DATs only are to be recorded, the information recording area $1b$ may be divided into two domains $1b_1$ and $1b_2$, as illustrated in FIG. 7(b). In this case also, the microcomputer 24 will set the domain $1b_1$ allotted to information from DATs having a high sampling frequency, in the outer periphery of the magneto-optical disk 1. As to analog information from magnetic tapes or other mediums, it is digitized according to the format used in CDs as described above and therefore recorded in the domain allotted to information from CDs. Furthermore, when wishing to use the entire information recording area $1b$ to record information from DATs, the instruction thereof should be specified through the display and operation section 28. When the instruction to divide the information recording area $1b$, or the instruction to use the entire information recording area $1b$ for recording information from a medium other than a CD, is not specified, it will be assumed that the standard mode is to be executed, i.e. information from CDs is to be recorded in the entire information recording area $1b$. Besides, after they are set, the details of the division can be modified as the occasion calls.

After the information recording area $1b$ is preliminary divided as described above, the recording source is connected to the disk recording/reproducing device and the user orders the recording of information by means of the display and operation section 28. The microcomputer 24 then determines what medium the recording source is and executes a consequent control such that the information is recorded in the domain among the domains $1b_1$ to $1b_3$ that corresponds to its sampling frequency. For instance, if the recording source is a CD, the microcomputer 24 executes the recording in the domain $1b_2$, and if the recording source is a DAT, in the domain $1b_1$. The user can specify at will whether to record in sections of the domains $1b_1$ to $1b_3$ that are still unrecorded or to write over previously recorded sections of the domains $1b_1$ to $1b_3$.

During the recording, the microcomputer 24 monitors the rotational speed of the spindle motor 2 so as to obtain the desired linear velocity in each of the domains $1b_1$ to $1b_3$. The actual speed of the spindle motor 2 may be detected for example by means of a rotary encoder, not shown, connected to the spindle motor 2. In addition, the microcomputer 24 monitors the rotational speed of the spindle motor 2 so as to obtain the desired linear velocity in each of the domains $1b_1$ to $1b_3$ during the reproduction too.

As described above, the linear velocity may be maintained constant within each of the domains $1b_1$ to $1b_3$ during the recording and the reproduction. This enables the frequency of changes in the linear velocity to be reduced, the burden imposed on the spindle motor 2 to be lightened and the latency due to changes in the linear velocity to be shortened.

In the above embodiment, the absolute addresses are recorded by means of the guiding grooves 14 that snake. However, mechanical pits may be employed instead of the guiding grooves 14 to record the absolute addresses. In that case too as described above, the absolute address to be reproduced is converted in the address operational circuit 27 in accordance with the linear velocity in each of the domains $1b_1$ to $1b_3$, and a corrected absolute address is determined.

In the present embodiments described above, the microcomputer 24 basically performs a constant linear velocity control for monitoring the rotation of the magneto-optical disk 1 and in addition, the linear velocity is changed in accordance with the sampling frequency of each information. However, a constant angular velocity control may be executed instead as control of the rotation of the magneto-optical disk 1 and the angular velocity changed in accordance with the sampling frequency of each information.

A magneto-optical disk was chosen and described as an example of writable recording medium, however the present invention can also be applied to rewritable disks of the phase transition type such as optical disks, or Direct Read after Write type disks whereon information can be recorded only once.

As described above, a recording/reproducing device in accordance with the present invention that performs the recording/reproduction of information on a writable recording medium comprising an information recording area and a TOC area and provided with guiding grooves that snake in cycles corresponding to absolute addresses, is characterized in comprising:

recording means for recording information in the information recording area, and for recording the absolute addresses indicating at least the position where the above information is recorded, as additional information in the TOC area, speed changing means for adjusting the velocity of the recording medium according to the sampling frequency of each information being recorded or reproduced, a demodulator that compares a frequency determined through the snaking cycles of the guiding grooves with a reference frequency, and where the absolute addresses are obtained through demodulation, demodulator adjusting means for changing the reference frequency of the demodulator in accordance with the sampling frequency of each information, and operational means for converting the absolute addresses after they were obtained through demodulation in the demodulator, according to the velocity of the recording medium, and for determining corrected absolute addresses that correspond to the time elapsed using the recording/reproduction starting time as reference.

Accordingly, the reference frequency of the demodulator is changed in accordance with the velocity the recording medium during the recording and reproduction of information. The absolute addresses may be thus obtained accurately by demodulating the cycles of the snaking guiding grooves when the velocity of the recording medium varies.

Moreover, provision is made such that the demodulated absolute addresses are converted in accordance with the velocity of the recording medium and corrected absolute addresses that correspond to the time elapsed using the recording/reproducing starting time as reference are determined. The time elapsed since the start of the recording and reproduction may be thus determined according to these corrected absolute addresses, and displayed.

As described above, another recording/reproducing device in accordance with the present invention that performs the recording/reproduction of information on a writable recording medium comprising an information recording area capable of recording a plurality of pieces of information produced in mutually different sampling frequencies, and a TOC area for recording additional information concerning the information recorded in the information recording area, comprises:

division setting means for dividing, according to a setting received from outside and to a set capacity ratio, the information recording area into a plurality of domains respectively corresponding to each sampling frequency of the pieces of information to be recorded, and for producing additional information that indicates the details of the division, recording means for determining the sampling frequency of the piece of information to be recorded, for recording each piece of information in a domain of the information recording area that corresponds to its sampling frequency, and for recording the additional information including the details of the division in the TOC area, reproducing means for reproducing the information recorded in the information recording area and the additional information recorded in the TOC area, driving means for driving the recording medium during the recording and the reproduction, and speed changing means for adjusting the speed of the driving means such that the velocity of the recording medium is changed in each domain when recording and reproduction is performed in the information recording area.

Accordingly, the information recording area of the recording medium is preliminary divided in accordance to a setting received from outside, i.e., an instruction from a user, into a plurality of domains that respectively correspond to each of the sampling frequencies used in CDs, DATs or other mediums and the pieces of information having the same sampling frequency are recorded in the same domain. When for example successive reproductions are performed on the recording medium, the velocity of the recording medium may be thus maintained constant within each domain. The number of times the velocity of the recording medium is changed can be reduced, thereby relieving the burden imposed on the driving means and reducing the overall latency due to the velocity changes.

When in addition to the above arrangement, the recording medium is a disk, and if the division is performed such that the domain corresponding to the higher the sampling frequency is located at the outer port of the disk; the closer the optical heads get to the outer periphery, the greater the linear velocity becomes. Therefore, the difference between the rotational speeds at different positions located on the same radius on the disk, is reduced as compared to the case where pieces of information of the same sampling frequency are recorded in the entire disk. Consequently, when access is carred out, and when the recording means and/or the reproducing means is moved in a radial direction, the amount by which the rotational speed of the driving means varies may be reduced.

Besides, the details of the division of the information recording area are recorded as additional information in the TOC area. As a result, once the recording medium is taken out from the recording/reproducing device, the recording/reproducing device is able to find out the details of the division by reading the information recorded in the TOC area during the next recording/reproduction.

The present invention being thus described, it will be obvious that the same may be varied in many ways. Such variations are not to be regarded as a departure from the scope of the invention.

There are described above novel features which the skilled artisan will appreciate their advantages. These are each independent aspects of the present invention to be covered by the present application, irrespective of whether or not they are included within the scope of the following claims.

What is claimed is:

1. A recording/reproducing device that performs recording onto and reproduction from a recording medium that includes an information recording area wherein information is recorded and a table of contents area wherein additional information concerning the information recorded in the information recording area is recorded, the recording medium being provided with guiding grooves that snake in cycles corresponding to absolute addresses, comprising:

recording means for recording information in the information recording area and for recording the absolute addresses indicating a position of the information recording area with respect to a reference velocity of the recording medium as additional information in the table of contents area;

speed changing means for changing a velocity of the recording medium according to a sampling frequency of the information being recorded or reproduced from the information recording area;

a demodulator for obtaining the absolute addresses through demodulation by comparing frequencies obtained from the snaking cycles of the guiding grooves with a reference frequency;

demodulator adjusting means, operatively connected to said demodulator, for changing said reference frequency of said demodulator in accordance with said sampling frequency of each information being recorded or reproduced; and operational means, operatively connected to said demodulator, for adjusting the demodulated absolute addresses, according to said velocity of the recording medium, to produce corrected absolute addresses, said corrected absolute addresses corresponding to a period of time which has elapsed since a starting time of a recording or reproducing operation, said velocity of the recording medium corresponding to said sampling frequency of the information being recorded or reproduced.

2. The recording/reproducing device as claimed in claim 1 wherein each time information is recorded in the information recording area, said recording means records additional information concerning the recorded information in the table of contents area.

3. The recording/reproducing device as claimed in claim 1, wherein the recording medium includes an optical card.

4. The recording/reproducing device as claimed in claim 1, wherein the recording medium includes a magneto-optical disk whereupon information is recorded, reproduced and erased using a magneto-optical effect.

5. The recording/reproducing device as claimed in claim 4, wherein said recording means comprises an optical head that projects a laser beam onto said magneto-optical disk and an electromagnet for applying an external magnetic field onto said magneto-optical disk in accordance with a recording signal.

6. The recording/reproducing device as claimed in claim 1, wherein the recording medium includes a rewritable disk whereupon information is recorded, reproduced and erased using a phase transition effect.

7. The recording/reproducing device as claimed in claim 1, wherein the recording medium includes a Direct Read after Write type disk whereupon information is recorded only once.

8. The recording/reproducing device as claimed in claim 6, wherein said recording means comprises an optical head that records and/or reproduces information by projecting a laser beam onto the recording medium.

9. The recording/reproducing device as claimed in claim 4, wherein rotation of said magneto-optical disk is controlled such that recording/reproduction of information is performed at a constant linear velocity.

10. The recording/reproducing device as claimed in claim 4, wherein rotation of said magneto-optical disk is controlled such that recording/reproduction of information is performed at a constant angular velocity.

11. The recording/reproducing device as claimed in claim 1, wherein said speed changing means comprises a microcomputer that controls the recording/reproducing device.

12. The recording/reproducing device as claimed in claim 1, wherein said demodulator comprises:

a phase-locked loop including, a phase comparator for comparing said reference frequency with the frequency generated by the snaking cycles and for producing a signal in accordance with the difference of these frequencies, a first low-pass filter for filtering out high frequency components contained in a signal received from said phase comparator, and a plurality of voltage controlled oscillators for producing said reference signal corresponding to frequency generated by the snaking cycles for said phase comparator in accordance with said signal received from said first low-pass filter; and a second low-pass filter connected to said phase comparator and connected in parallel with said first low-pass filter.

13. The recording/reproducing device as claimed in claim 12, wherein said demodulator adjusting means comprises changeover switches that switch from one of said voltage controlled oscillators to another in accordance with said sampling frequency of the information being recorded.

14. The recording/reproducing device as claimed in claim 1 wherein said demodulator comprises:

a phase-locked loop including, a phase comparator for comparing said reference frequency with the frequency generated by the snaking cycles and for producing a signal in accordance with the difference of these frequencies, a first low-pass filter for filtering out high frequency components contained in a signal received from said phase comparator, a voltage controlled oscillator for producing a signal corresponding to the frequency generated by the snaking cycles in accordance with said signal received from said first low-pass filter, and a plurality of frequency dividers, having mutually different division ratios, for generating the frequency corresponding to the snaking cycles in accordance with said signal received from said voltage controlled oscillator; and a second low-pass filter connected to said phase comparator and connected in parallel with said first low-pass filter.

15. The recording/reproducing device as claimed in claim 14, wherein said demodulator adjusting means comprises changeover switches that switch from one of said frequency dividers to another in accordance with said sampling frequency of the information being recorded.

16. The recording/reproducing device as claimed in claim 1, wherein said operational means comprises an address operational circuit which converts values of the absolute addresses into values of said corrected absolute addresses.

17. A recording/reproducing device that performs a recording of information onto an unformatted recording medium that includes an information recording area wherein a plurality of pieces of information produced from mutually different sampling frequencies are recorded, and a table of contents area wherein additional information concerning the information recorded in the information recording area, comprising:
   division setting means for dividing the information recording area prior to the actual recording process into a plurality of domains, each domain having a distinct physical length corresponding to a sampling frequency associated with the information being recorded and for producing additional information representing the length established by the division process;
   recording means for determining said sampling frequency of the information being recorded, for recording information only in said domains that said division setting means has established as corresponding to said sampling frequency of the information, and for recording said additional information representing the division in the table of contents area;
   driving means for driving the recording medium at a constant linear velocity during recording and reproduction; and
   speed changing means for adjusting said driving means such that the constant linear velocity of the recording medium is charged for each domain when recording or reproducing information.

18. The recording/reproducing device as claimed in claim 17 wherein each time information is recorded in the information recording area, said recording means records additional information concerning the information being recorded in the table of contents area.

19. The recording/reproducing device as claimed in claim 17, wherein the recording medium is provided with guiding grooves that snake in cycles corresponding to values of absolute addresses.

20. The recording/reproducing device as claimed in claim 17, wherein the recording medium comprises absolute addresses indicated by mechanical pits.

21. The recording/reproducing device as claimed in claim 17 wherein said division setting means and said speed changing means are within a microcomputer that controls the recording/reproducing device.

22. The recording/reproducing device as claimed in claim 17, wherein the recording medium includes an optical card.

23. The recording/reproducing device as claimed in claim 17, wherein the recording medium includes a magneto-optical disk whereupon informaton is recorded, reproduced and erased using a magneto-optical effect.

24. The recording/reproducing device as claimed in claim 23, wherein said recording means comprises an optical head that projects a laser beam onto said magneto-optical disk, and an electromagnet for applying an external magnetic field onto said magneto-optical disk in accordance with a recording signal.

25. The recording/reproducing device as claimed in claim 17 wherein the recording meduim includes a rewritable disk whereupon information is recorded, reproduced and erased information using a phase transition effect.

26. The recording/reproducing device as claimed in claim 17, wherein the recording medium includes a Direct Read after Write type disk whereupon information is recorded only once.

27. The recording/reproducing device as claimed in claim 25, wherein said recording means and said reproducing means comprise an optical head that records and/or reproduces information by projecting a laser beam onto said rewritable disk.

28. The recording/reproducing device as claimed in claim 23, wherein said driving means is a spindle motor.

29. The recording/reproducing device as claimed in claim 23, wherein rotation of said magneto-optical disk is controlled such that the recording/reproducing of information is performed at a constant linear velocity.

30. The recording/reproducing device as claimed in claim 23, wherein rotation of said magneto-optical disk is controlled such that the recording/reproduction of information is performed at a constant angular velocity.

31. The recording/reproducing device as claimed in claim 23, wherein said division setting means divides the information recording area such that a highest sampling frequency is located at an outer position on said magneto-optical disk.

32. The recording/reproducing device as claimed in claim 7, wherein said recording means comprises an optical head that records and/or reproduces information by projecting a laser beam onto said Direct Read after Write type disk.

33. The recording/reproducing device as claimed in claim 6, wherein rotation of said rewritable disk controlled such that the recording/reproduction of information is preformed at a constant linear velocity.

34. The recording/reproducing device as claimed in claim 7, wherein rotation of said Direct Read after Write type disk is controlled such that the recording/reproduction of information is performed at a constant linear velocity.

35. The recording/reproducing device as claimed in claim 6, wherein rotation of said rewritable disk is controlled such that the recording/reproduction of information is performed at a constant angular velocity.

36. The recording/reproducing device as claimed in claim 7, wherein rotation of said Direct Read after Write type disk is controlled such that the recording/reproduction of information is performed at a constant angular velocity.

37. The recording/reproducing device as claimed in claim 26, wherein recording means and said reproducing means comprise an optical head that records and/or reproduces inforamtion by projects a laser beam on said Direct Read after Write type disk.

38. The recording/reproducing device as claimed in claim 25, wherein said driving means is a spindle motor.

39. The recording/reproducing device as claimed in claim 26, wherein driving means is a spindle motor.

40. The recording/reproducing device as claimed in claim 25, wherein rotation of said rewritable disk is controlled such that the recording/reproduction of information is performed at a constant linear velocity.

41. The recording/reproducing device as claimed in claim 26, wherein the rotation of said Direct Read after Write type disk is controlled such that the recording/reproduction of information is performed at a constant linear velocity.

42. The recording/reproducing device as claimed in claim 25, wherein the rotation of said rewritable disk is controlled such that the recording/reproduction of information is performed at a constant angular velocity.

43. The recording/reproducing device as claimed in claim 26, wherein the rotation of said Direct Read after Write type disk is controlled such that the recording/reproduction of information is performed at a constant angular velocity.

44. The recording/reproducing device as claimed in claim 25, wherein said division setting means divides the information recording area such that a highest sampling frequency is located at an outer portion on said rewritable disk.

45. The recording/reproducing device as claimed in claim 26, wherein said division setting means divides the information recording area such that a highest sampling frequency is located at an outer portion on said Direct Read after Write type disk.

* * * * *